J. KELSEY.
METHOD OF FORMING WHEEL HUBS.
APPLICATION FILED DEC. 8, 1914.
1,129,989.
Patented Mar. 2, 1915.
2 SHEETS—SHEET 1.
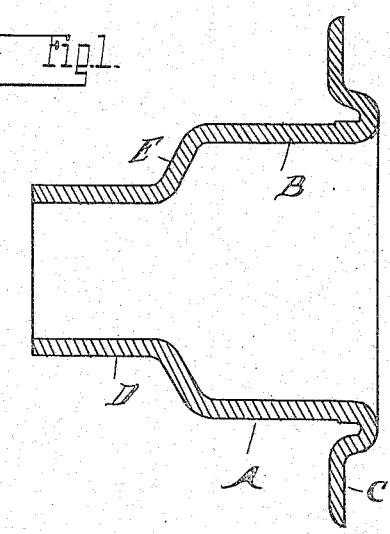
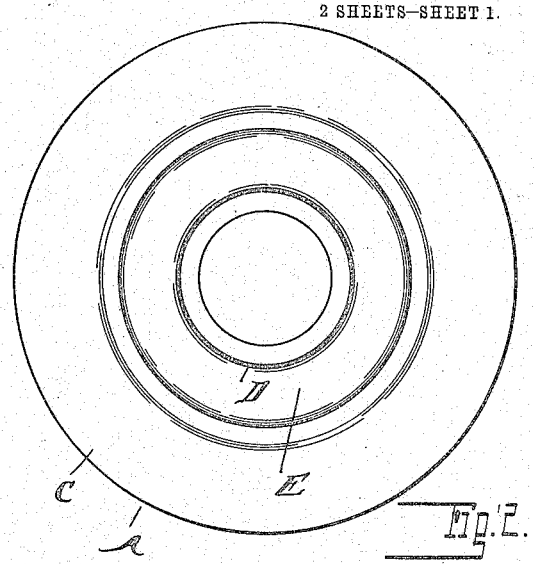
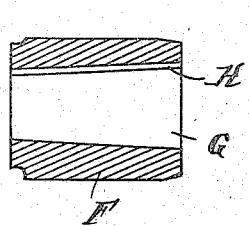
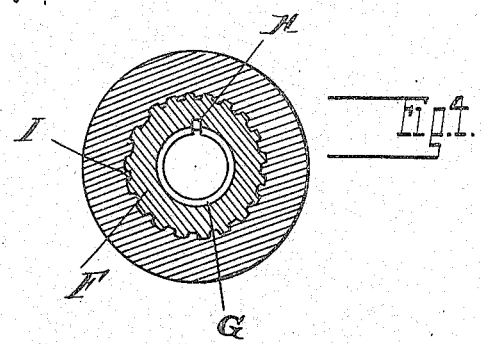
WITNESSES:
W. K. Ford
James P. Barry
INVENTOR
John Kelsey
BY
Whittemore Hulbert & Whittemore
ATTORNEYS J. KELSEY.
METHOD OF FORMING WHEEL HUBS.
APPLICATION FILED DEC. 8, 1914.
1,129,989.
Patented Mar. 2, 1915.
2 SHEETS—SHEET 2.
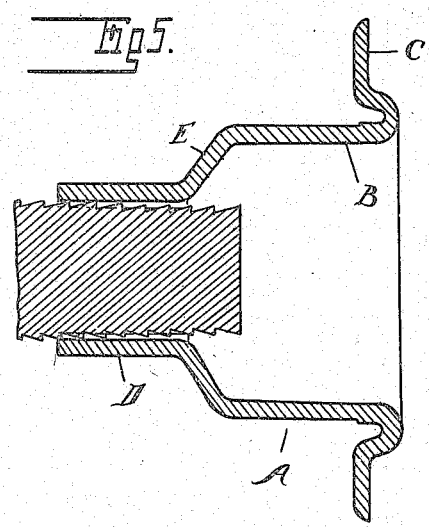
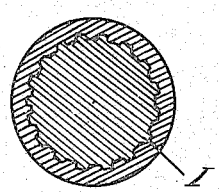
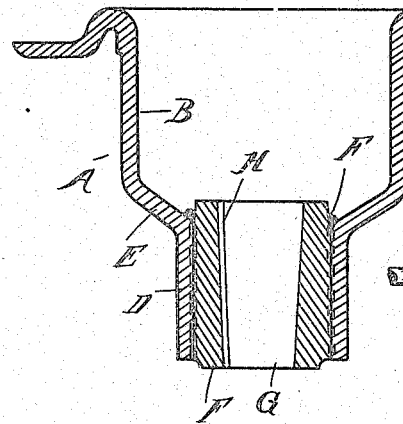
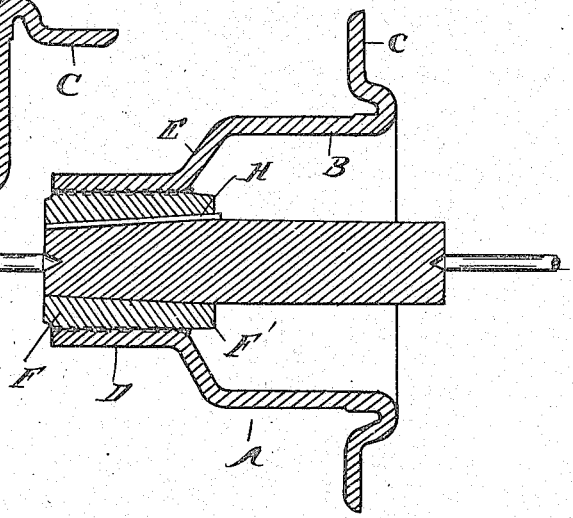
WITNESSES:
INVENTOR
John Kelsey
BY
Whittemore Hulbert & Whittemore
ATTORNEYS

UNITED STATES PATENT OFFICE.

JOHN KELSEY, OF DETROIT, MICHIGAN.

METHOD OF FORMING WHEEL-HUBS.

1,129,989.  Specification of Letters Patent.  Patented Mar. 2, 1915.

Application filed December 8, 1914. Serial No. 876,094.

*To all whom it may concern:*

Be it known that I, JOHN KELSEY, a citizen of the United States of America, residing at Detroit, in the county of Wayne and State of Michigan, have invented certain new and useful Improvements in Methods of Forming Wheel-Hubs, of which the following is a specification, reference being had therein to the accompanying drawings.

The invention relates to wheel hubs of the type provided with an enlarged recess for the reception of roller bearings, and the invention comprises the novel method of forming said hub of a reinforced pressed sheet metal member as hereinafter set forth.

In the drawings: Figure 1 is a longitudinal section through the pressed sheet metal member; Fig. 2 is an end elevation thereof; Fig. 3 shows the bushing for reinforcing the pressed sheet metal member; Fig. 4 illustrates the manner of broaching the outer surface of the bushing to form longitudinal serrations therein; Fig. 5 shows the manner of broaching the pressed sheet metal member to form complementary serrations in the inner surface thereof; Fig. 6 is a cross section through the pressed sheet metal member and bushing in engagement with each other; Fig. 7 is a longitudinal section showing the manner of brazing the joint; and Fig. 8 is a similar view showing the truing operation.

It is the primary object of the invention to cheapen the cost of manufacture by substituting for a forged blank a blank formed of a pressed sheet metal member having a bushing or reinforcement for increasing the thickness of the walls thereof. It is essential that the bushing and the blank should be so united as to carry heavy torsional stresses from one to the other and it is equally important that this should be accomplished without thinning or weakening the sheet metal wall. To accomplish this result I first form by pressing operations a sheet metal member A having the cylindrical portion B and outwardly-extending flange C, and a cylindrical portion D of lesser diameter than the portion B connected therewith by the flaring portion E. I then form a bushing member F, preferably from a forging, which is bored preferably with a tapering hole G for fitting a correspondingly tapered portion of the axle, A splineway H is also formed along the bore G for keying the bushing to the shaft. The outer surface of the member F is then fashioned by a broaching operation, as shown in Fig. 4, so as to form a circumferential series of longitudinally-extending serrations I. The member A is internally broached, as shown in Fig. 5, to form a complementary series of serrations adapted to engage and interlock with the serrations on the member F. The two members are then pressed together with the member F projecting a short distance beyond the flaring portion E, as shown at F', into the cylindrical recess of the portion B. Braize or other fusible adhesive metal is then placed around the projecting portion F', and the structure is heated to a sufficient temperature to melt the braize and permit it to flow into the joint sealing and uniting the two members. The structure is then mounted upon a mandrel engaging the bore G, and is trued concentric with the axis of this bore, as shown in Fig. 8.

What I claim as my invention is:—

1. The method of forming wheel hubs, comprising the pressing of a sheet metal blank to form a flanged cylindrical portion, forming a bushing for said cylindrical portion, broaching the outer surface of said bushing and the inner surface of said cylindrical portion to form complementary inter-engageable serrations, pressing said members into engagement with each other and truing the completed structure concentric with the bore of the bushing.

2. The method of forming wheel hubs, comprising the pressing of a sheet metal blank to form a flanged cylindrical member, forming a bushing for the cylindrical portion of said member, broaching the outer surface of said bushing and inner surface of said cylindrical member to form complementary inter-engageable serrations therein, pressing said members together, and brazing the joint between said members.

3. The method of forming wheel hubs, comprising the pressing of a sheet metal blank to form a member having cylindrical portions of different diameters and an outwardly-extending flange, forming a bushing for the cylindrical portion of lesser diameter, broaching the outer face of said bushing and inner face of said cylindrical member to produce complementary inter-engageable serrations, pressing said bushing into engagement with said sheet metal member with an end portion of the bushing projecting into a recess formed by the enlarged cylindrical portion of the sheet metal member, placing a fusible adhesive metal around said projecting portion of the bushing, and heating to fuse said metal and to seal the joint between said serrated faces.

In testimony whereof I affix my signature in presence of two witnesses.

JOHN KELSEY.

Witnesses:
L. H. McCracken,
L. C. Brooks.